(12) United States Patent
Singh

(10) Patent No.: US 10,152,481 B1
(45) Date of Patent: Dec. 11, 2018

(54) TECHNIQUE TO SCALE OUT NAMESPACE

(71) Applicant: EMC Corporation, Hopkinton, MA (US)

(72) Inventor: Pranay Singh, San Ramon, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 258 days.

(21) Appl. No.: 14/958,469

(22) Filed: Dec. 3, 2015

(51) Int. Cl.
*G06F 17/00* (2006.01)
*G06F 17/30* (2006.01)

(52) U.S. Cl.
CPC .. *G06F 17/30082* (2013.01); *G06F 17/30088* (2013.01); *G06F 17/30156* (2013.01); *G06F 17/30194* (2013.01)

(58) Field of Classification Search
CPC ............... G06F 3/067; G06F 17/30091; G06F 17/30174; G06F 17/302; G06F 3/0619; G06F 3/0644
See application file for complete search history.

(56) References Cited

U.S. PATENT DOCUMENTS

| 2010/0082672 | A1* | 4/2010 | Kottomtharayil ... G06F 11/1451 707/770 |
| 2014/0006464 | A1* | 1/2014 | Pitts ..................... G06F 15/167 707/827 |
| 2014/0006465 | A1* | 1/2014 | Davis ................ G06F 17/30194 707/827 |

* cited by examiner

*Primary Examiner* — Truong V Vo
(74) *Attorney, Agent, or Firm* — Womble Bond Dickinson (US) LLP

(57) ABSTRACT

A first data is stored in a first filesystem data storage, wherein the first filesystem data storage is part of a first cluster node that comprises a common filesystem metadata. A second data is stored in a second filesystem data storage, wherein the second filesystem data storage is part of a second cluster node coupled with the first cluster node that comprises the common filesystem metadata. The first cluster node and the second cluster node are associated with a cluster for shared storage.

19 Claims, 12 Drawing Sheets

US 10,152,481 B1

TECHNIQUE TO SCALE OUT NAMESPACE

BACKGROUND OF THE INVENTION

Scaling a system accommodates growth for a user of the system. One important system is a server system, which includes filesystem service and/or virtual machine service. One method to scale a server system includes scaling horizontally, or scale-out, by adding nodes to the server system, such as adding a computer. One way of scale-out server systems is to use cluster computing in a general sense, using loosely/tightly connected computers/nodes that work together so that in at least one respect they can be viewed as a single system.

Adding computer nodes to a server system involves overhead to relay messaging between the existing and additional computer nodes, which reduces performance. There exists a need to reduce overhead and improve performance in scale-out server systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A common filesystem metadata shared between scale-out computer nodes in a server system is disclosed. In one embodiment, the filesystem is a deduplicating filesystem. In one embodiment, the common filesystem metadata offers a dynamic partitioning of a global namespace for the associated cluster of computer nodes.

Scale-out of a deduplicating server/resource (DDR) may use a shared storage environment. In one embodiment, the method of sharing is based on the following principles:
  Dynamic partition of namespace, for example offering a global namespace; and
  Block recoverability, for example such that blocks stored in a computer node can be recovered in the event of a computer node crash.

Figure 1:
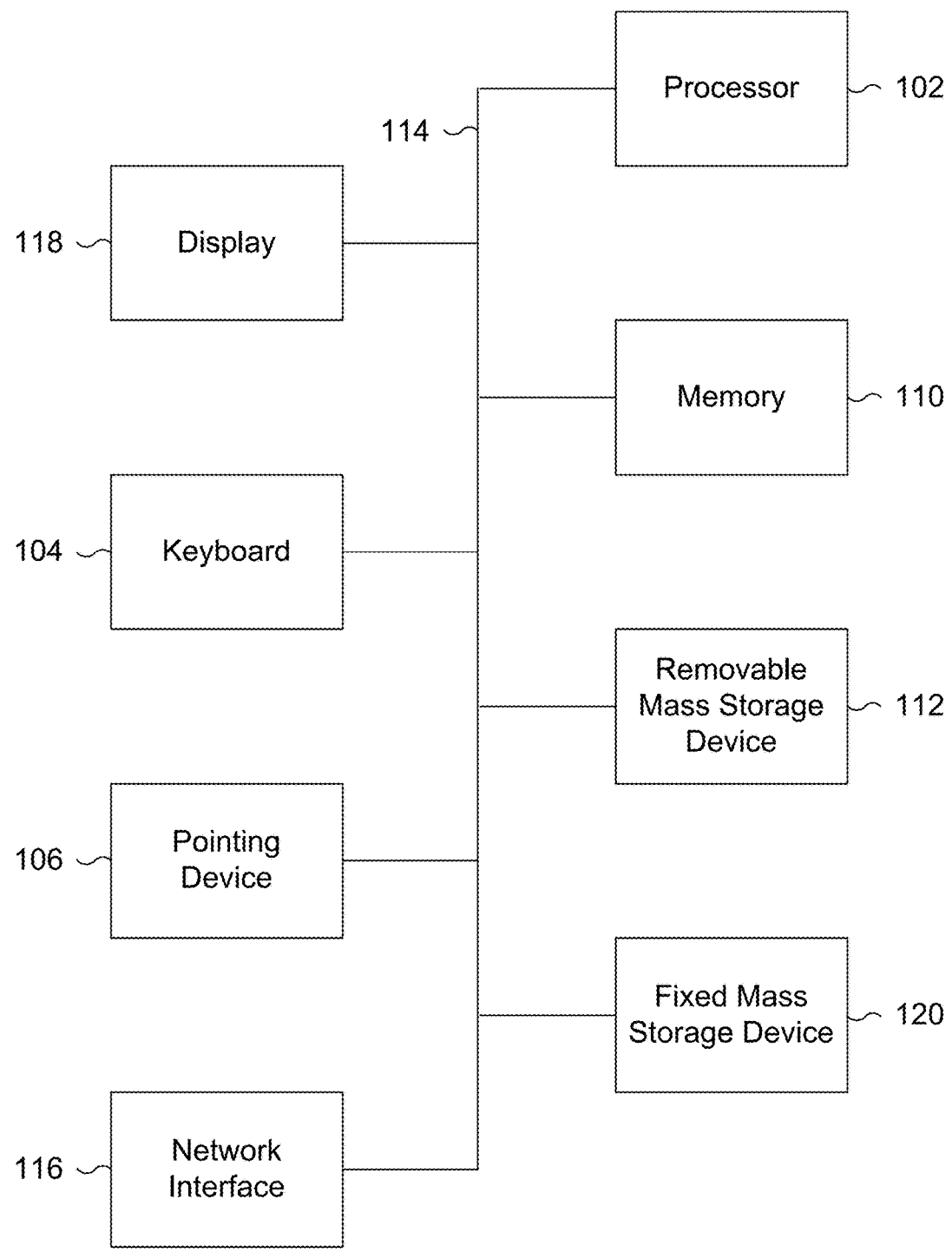
FIG. 1 is a functional diagram illustrating a programmed computer system for namespace scale-out in accordance with some embodiments.

FIG. 1 is a functional diagram illustrating a programmed computer system for namespace scale-out in accordance with some embodiments. As shown, FIG. 1 provides a functional diagram of a general purpose computer system programmed to execute namespace scale-out in accordance with some embodiments. As will be apparent, other computer system architectures and configurations can be used to execute namespace scale-out. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard-disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Express-card, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
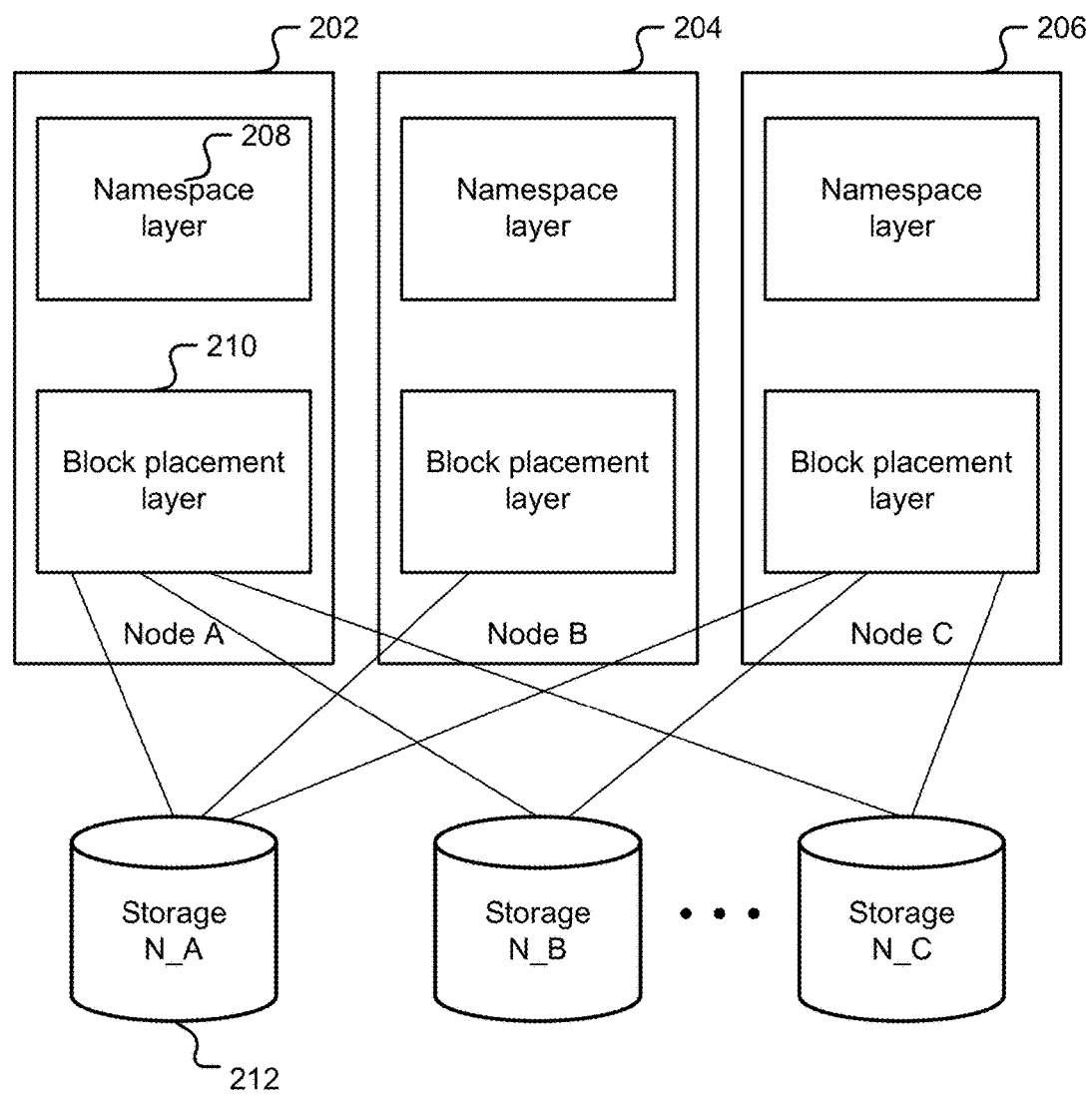
FIG. 2 is a block diagram illustrating an embodiment of a system for scale-out namespace.

FIG. 2 is a block diagram illustrating an embodiment of a system for scale-out namespace. In one embodiment, each of the computer nodes shown in FIG. 2 may be represented by one or more computers as shown in FIG. 1.

The system comprises one or more computer nodes, shown with at least three computer nodes in FIG. 2, Node A (202), Node B (204), and Node C (206). In one embodiment, each computer node (202), (204), (206) is divided into two or more layers. The first layer is a namespace layer (208) that performs, amongst other tasks, dynamic partition of namespace. In one embodiment, the namespace layer (208) is part of a deduplication filesystem ("DDFS"). The second layer is a block placement layer (210) that may write data, for example blocks, across different computer nodes to storage systems (212). For example, there may be a Content Store N_A (212) corresponding to Node A (202), and so on.

Dynamic Partitioning of the Namespace.

Dynamic partitioning namespace across the computer nodes of a cluster environment is disclosed. Traditionally different schemes are employed to partition the namespace including static partitions and hash based partitions. Static partitioning of namespace may unfortunately create data skew, which later affects performance of computer nodes with large amount of data. Hash based partitioning of namespace tends to distribute namespace across computer nodes and destroys the locality of filesystem entities like directory and files. Throughout this specification a 'filesystem entity' refers to any object defined for a filesystem including a file, a directory, a volume, and so forth.

By contrast, dynamic partitioning of namespace across computer nodes improves performance over the traditional static and hash based partitioning. In one embodiment, dynamic namespace partitioning scheme partitions a B+tree across different computer nodes in the computer cluster. Any person having ordinary skill in the art will understand a B+tree as a computer science-based data structure: a self-balancing n-ary tree that keeps data sorted in which leaves are the only substructure that carry key-value pairs, and root/internal level nodes only carry keys. B+trees are used, for example, in other filesystems like the ReiserFS for metadata indexing.

Figure 3A:
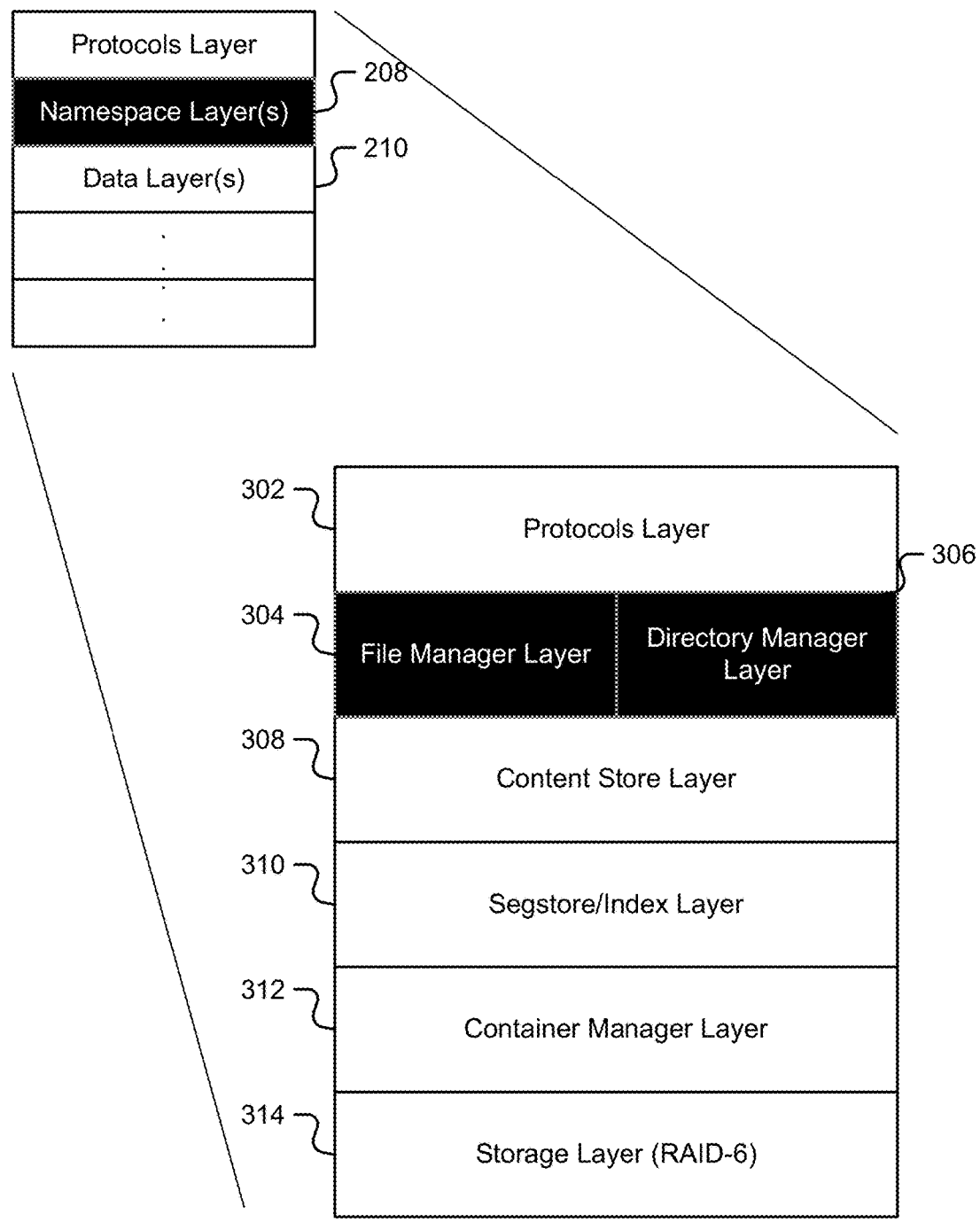
FIG. 3A is a block diagram illustrating a computer node system.

FIG. 3A is a block diagram illustrating a computer node system. The computer nodes (202), (204), (206) in FIG. 2 are examples of that shown in FIG. 3A for a given filesystem. Without loss of generality, a DDFS computer node is shown.

The namespace layer (208) and data layer(s) (210) are shown in greater detail as a tiered filesystem which has different components, with up to seven layers:

Protocols Layer (302):

The data and the files written to the computer cluster are written through the protocols. Examples of protocols for this may include without limitation NFS, CIFS, and an Open Storage Technology (OST)-based protocol.

File Manager Layer (304):

Files and data written to a protocol layer (302) are redirected to a File Manager Layer of the filesystem, where the namespace operations like file creation, file deletion, directory creation, directory deletion, and rename of a file/directory is routed to a Directory Manager component of the filesystem and data operations on a file like reading/writing to a file is routed to a Content Store layer of the filesystem.

Directory Manager Layer (306):

This layer (306) stores namespace of the filesystem in a B+tree data structure, which is stored as a regular Content Store (CS) file. Storing the files in the B+tree such that files for the same directory are stored together may help improve performance in reading a directory. This layer (306) may also provide operations that help to create snapshots of the filesystem and may provide functions that help in doing replication. The B+tree may also be referred throughout this specification as an Mtree which for example may be mapped as a virtual tape library (VTL) pool, an OST unit, an NFS export, and/or a CIFS share.

Content Store Layer (308):

This layer (308) of the file system provides the mapping of a file to stream and/or other data/Content Store. For example, a stream may be required to read/write the data from a segstore layer in a deduplicating filesystem or a block layer. Besides providing file to stream/content mapping, this layer may store a block map of the file in the form of a checksum tree. An example of a checksum tree is a Merkle tree, which includes hashes (for example, using SHA-1) corresponding to each block. This layer (308) may also do anchoring or chunking of data blocks as they arrive. At some later point, a hash like SHA-1 may be calculated for each of these blocks.

Segstore/Index Layer (310):

This layer (310) packs data written to stream/Content Store to be written to, for example, a container in a compressed format. It may also filter duplicate segments from being written to containers by having a duplicate segment cache. The data to be read by Content Store is identified by hash, for example SHA-1, that is mapped to a container manager. The mapping of the hash to corresponding container is maintained by an index, which may be referred to as a hashtable and would be a persistent data structure.

Container Manager Layer (312):

Data written to stream may be packed in a container as a set of compression regions. In one embodiment, each container is 4.5 MB in size constituted of compression regions that are read or written as the unit of JO.

Storage Layer (314):

A storage layer (314) provides APIs to write the data to a set of disks. In a preferred embodiment, the disks are grouped in a RAID-6 configuration.

Figure 3B:
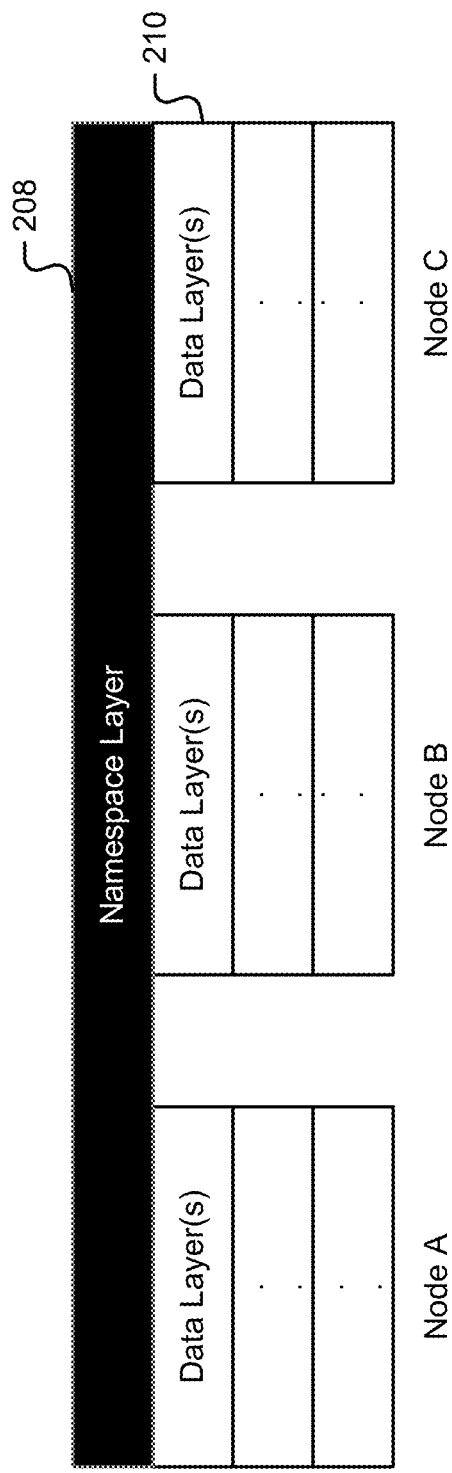
FIG. 3B is a block diagram illustrating dynamic namespace partitioning for a computer node system.

FIG. 3B is a block diagram illustrating dynamic namespace partitioning for a computer node system. In one embodiment, the computer node system being partitioned is shown in FIG. 3A.

As depicted conceptually in FIG. 3B, namespace layer (208) spans every computer node as a global namespace, shown here as Node A, Node B, and Node C, while each computer node has its own data layers (210).

Figure 4A:
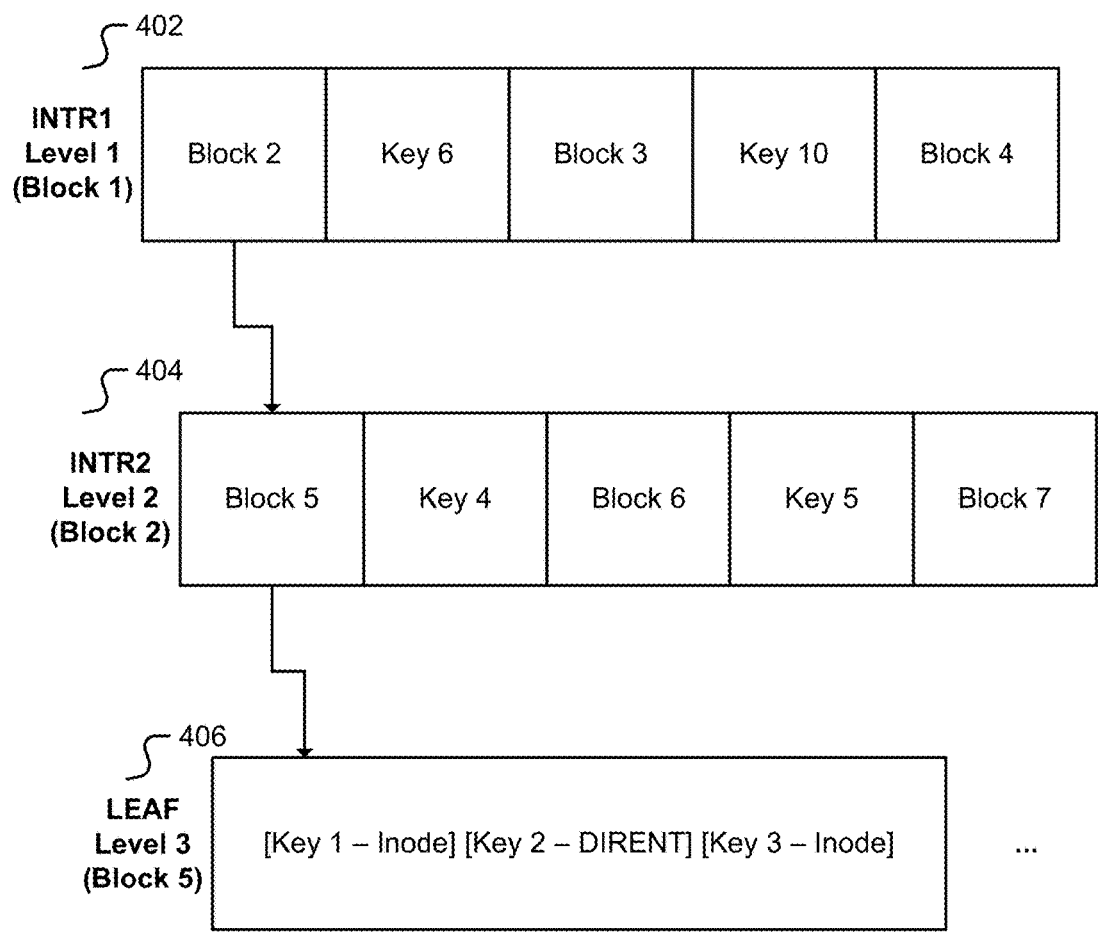
FIG. 4A is a block diagram illustrating an embodiment of a tree data structure in a Directory Manager for storing namespace.

FIG. 4A is a block diagram illustrating an embodiment of a tree data structure in a Directory Manager for storing namespace. In one embodiment, the tree is a B+tree and/or Mtree for Directory Manager layer (306). The embodiment shown in FIG. 4A may store namespace on a single machine.

As is traditional, an Mode includes a data structure to represent each filesystem object, including a unique number to identify every file or directory in a filesystem. Directory Manager (306) stores the files and directory in the Mtree, a B+tree data structure, which stores the data in leaf level node, and indices in the internal level node. FIG. 4A shows a three level B+tree data structure to store the namespace, where INTR1 (402) is a set of Level 1 internal level nodes, INTR2 (404) is a set of Level 2 internal level nodes, and Level 3 (406) are the leaf level nodes. Files and directories are stored in leaf level nodes (406) as data, along with the key identifying unique inode or directory, whereas only the keys are stored in the internal level node.

The Key used in an Mtree/B+tree data structure is a composite key constituted of parent inode number and child inode number. The parent inode number occupies the most significant bytes of the key and child inode number occupies the least significant bytes of the key. Organizing the key in this fashion helps to group all the files or directories within a directory, which helps to improve the performance of operations such as reading a directory with readdir, and so forth.

Figure 4B:
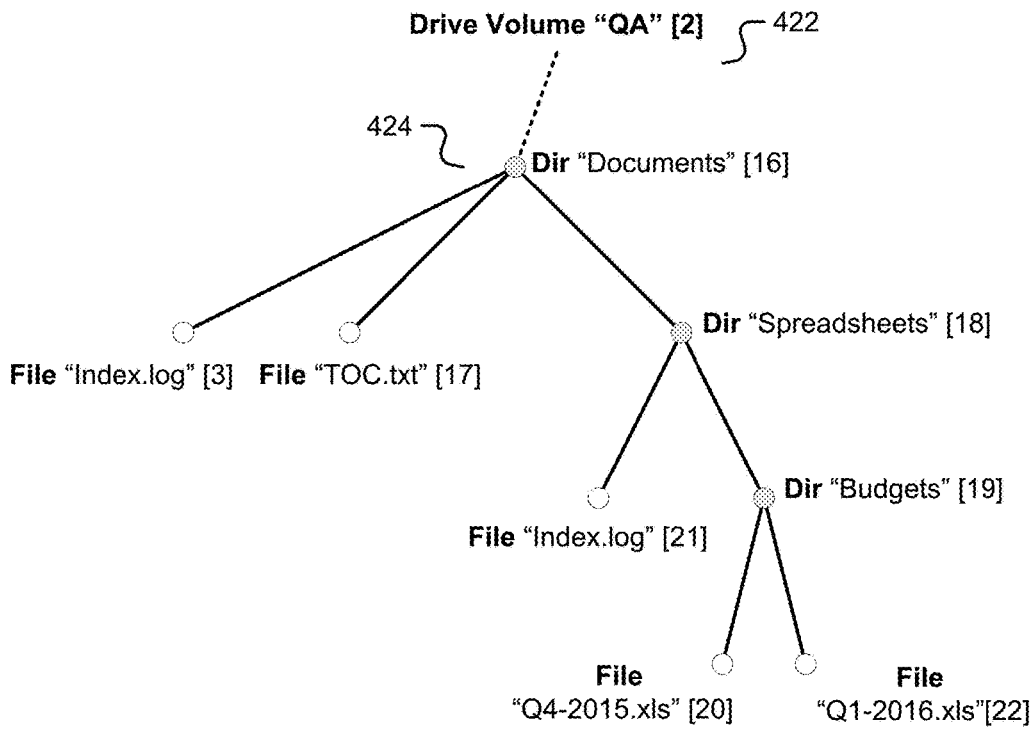
FIG. 4B is an illustration of a hierarchical directory-file example.

FIG. 4B is an illustration of a hierarchical directory-file example. Each volume, directory, and/or file has an inode number in square brackets to the right of the name. For example, drive volume "QA" with inode 2 (422) has a root directory "Documents" with inode 16 (424). The example shown in FIG. 4B may store namespace on a single machine.

Continuing the example, as one might find with Windows and/or UNIX, in the filesystem the following hierarchy is depicted, with associated inode:

| Namespace | Type | inode |
| --- | --- | --- |
| //QA/ | Volume | 2 |
| //QA/Documents/ | Directory | 16 |
| //QA/Documents/Index.log | File | 3 |
| //QA/Documents/TOC.txt | File | 17 |
| //QA/Documents/Spreadsheets/ | Directory | 18 |
| //QA/Documents/Spreadsheets/Index.log | File | 21 |

| Namespace | Type | inode |
|---|---|---|
| //QA/Documents/Spreadsheets/Budgets/ | Directory | 19 |
| //QA/Documents/Spreadsheets/Budgets/Q4-2015.xls | File | 20 |
| //QA/Documents/Spreadsheets/Budgets/Q1-2016.xls | File | 22 |

Figure 4C:
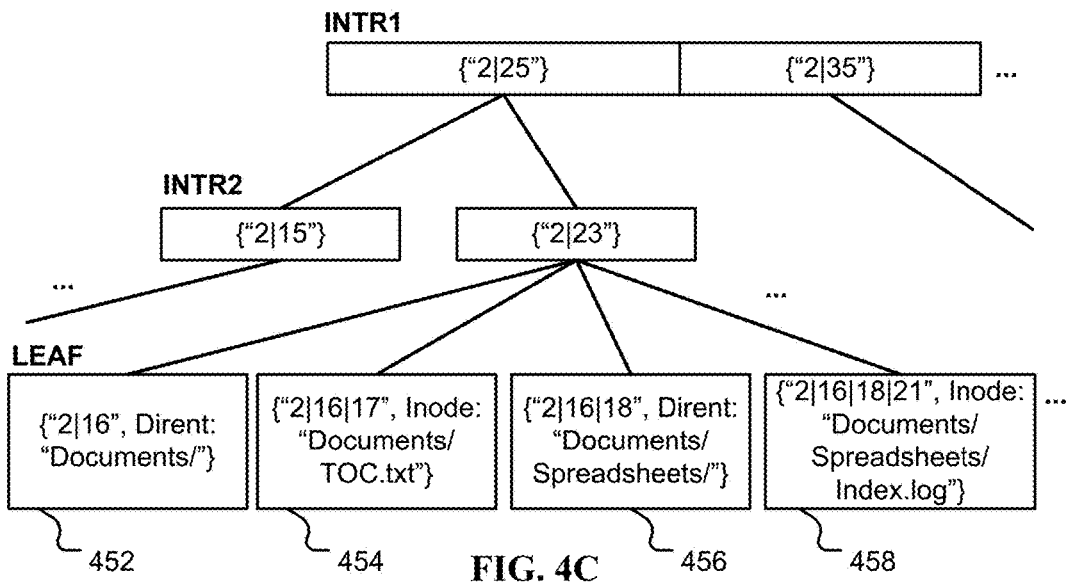
FIG. 4C is a diagram illustrating the Mtree for the example in FIG. 4B.

FIG. 4C is a diagram illustrating the Mtree for the example in FIG. 4B. In one embodiment FIG. 4C is an example of the structure described in FIG. 4A. The composite key for each of the leaf level nodes shown includes the hierarchy of depicted in FIG. 4B.

For example, the first leaf level node (452) shown has a composite key "2|16" to represent the directory entry/dirent/inode for "//QA/Documents/" [16] which is in volume "//QA" [2]. The second leaf level node (454) has a composite key "2|16|17" to represent the inode for "//QA/Documents/TOC.txt" [17] which is in subdirectory "//QA/Documents/" [16].

The third leaf level node (456) has a composite key "2||6||8" to represent the dirent/inode for "//QA/Documents/Spreadsheets/" [18], also in subdirectory "//QA/Documents/" [16]. The fourth leaf level node (458) has a composite key "2||6|18|21" to represent the indoe for "//QA/Documents/Spreadsheets/Index.log" [21], in subdirectory "//QA/Documents/Spreadsheets/" [18].

B+Tree Layout for Storing the Namespace Beyond a Single Machine.

Throughout this specification a "computer cluster" refers to any instance where computer cluster is a setup where a plurality of computers are connected and viewed as a single system. Storing namespace in a computer cluster is disclosed using some of the principles for single machines from FIGS. 4A-4C.

In one embodiment, partitioning the namespace across the computer cluster uses dynamic partitioning. Namespace spread across all the computer nodes, is referred to as a global or unified namespace. Implementing a global or unified namespace by doing a dynamic partition of namespace is disclosed.

Figure 5A:
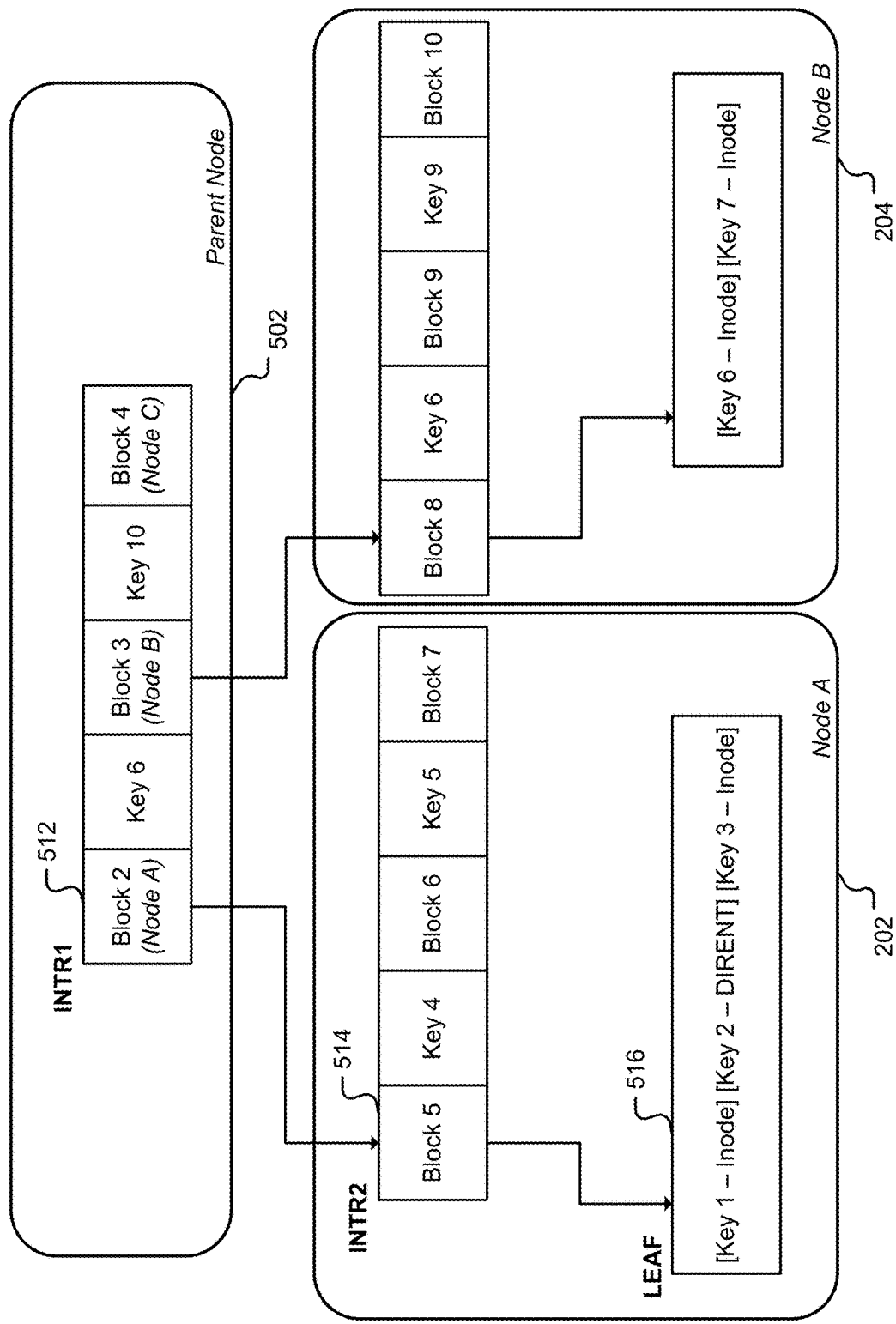
FIG. 5A is a block diagram illustrating an embodiment of a computer cluster extension for the Mtree.

FIG. 5A is a block diagram illustrating an embodiment of a computer cluster extension for the Mtree. The Mtree/B+tree shown in FIGS. 4A-4C which stores the namespace data, files and directory may be modified to create a global namespace for a computer cluster. The new scheme proposes a concept of ownership of INTR2 level nodes and leaf level nodes to a computer node in the computer cluster, which results in a B+tree, which is distributed across different computer nodes in the computer cluster.

The new scheme of storing the B+tree is shown in FIG. 5A, which shows the Mtree/B+tree layout for a computer cluster, wherein the INTR 2 level nodes and leaf level node are owned by a computer node.

In one embodiment, the INTR 1 level node at the top resides in one computer node, termed the "parent node", which keeps track of where INTR 2 level nodes reside. INTR 2 level nodes can reside in the same computer node (parent node) where a given INTR 1 level node resides or in a "remote node", wherein a remote node is a computer node different from the parent node. The computer node where a specified INTR 2 level node resides also is assigned all of leaf level nodes associated with the specified INT2 level node.

Namespace operations including creation of a file or directory, removal of a file or directory, update an existing file or lookup of a file or directory, reading a directory, or any manipulation of a filesystem entity involving namespace are done on a local computer node if an associated INTR 2 level node resides locally or on a remote computer node if the associated INTR2 level node resides remotely.

For example, in FIG. 5A, parent node (502) contains the root/INTR1 level node for the global namespace, and the associated blocks are themselves nodes, for example Node A (202), Node B (204), and Node C (206)—not shown. The parent node (502) may be a separate computer node or may be one of Node A (202), Node B (204), or Node C (206).

In the example shown in FIG. 5A, INTR1 level node for Block 2 (512) is associated with Node A (202) so that Block 5 is associated with the INTR2 level node (514) in Node A (202), with leaf level node (516) also in Node A (202).

Figure 5B:
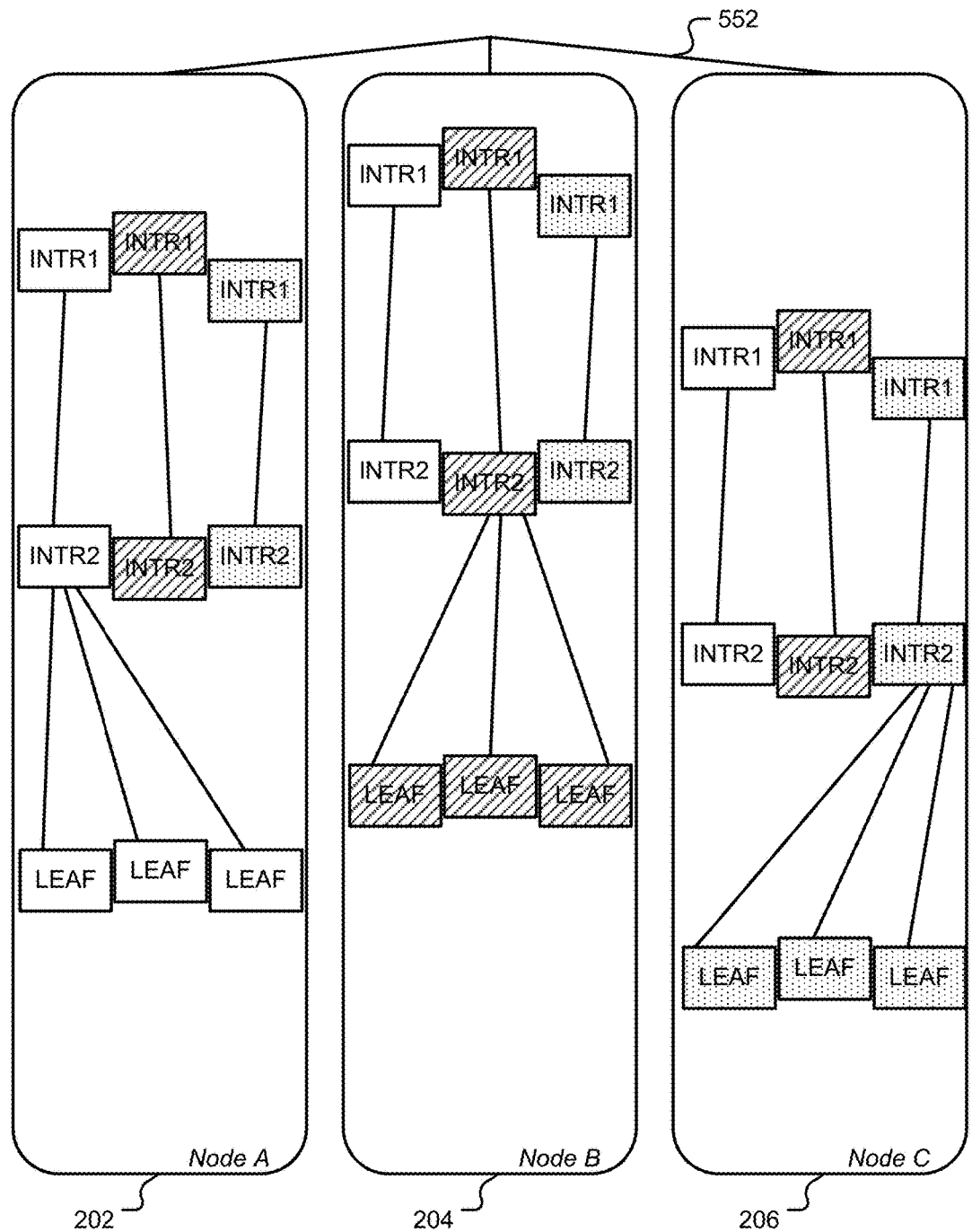
FIG. 5B is a block diagram illustrating an embodiment of a tree spread across different nodes in a computer cluster.

FIG. 5B is a block diagram illustrating an embodiment of a tree spread across different nodes in a computer cluster. Without loss of generality, the example shown in FIG. 5B is that of three computer nodes in the computer cluster.

Computer Node A (202), Node B (204), and Node C (206) are shown interconnected (552) as a computer cluster. As was shown in FIG. 5A (502), the parent node (not explicitly shown) has an INTR1 level node with three computer nodes: Node A, Node B, and Node C.

Leaf level nodes are depicted in FIG. 5B such that leaf level nodes for Node A (202) are white, leaf level nodes for Node B (204) are diagonally stripped, and leaf level nodes for Node C (206) are dotted.

In one embodiment, the B+tree is set to depth three and only contains data in the leaf level nodes, so all INTR1 level nodes and INTR2 level nodes are replicated in each and every computer node, as shown in FIG. 5B. Thus FIG. 5B shows a layout of the B+tree on a scale-out computer cluster, spread across its three different computer nodes. Each of these computer nodes has a copy of internal nodes of the B+tree from local and remote nodes. The leaf level nodes are not replicated over to another remote node, however.

The Directory Manager (306) component of the filesystem, for example DDFS, stores the namespace in the form of B+tree. The B+tree is thus partitioned dynamically across different nodes in a cluster.

"Ownership" of Filesystem Entity.

Files and directory in Directory Manager (3060 are stored in leaf level nodes of its associated B+tree. The computer node where a given leaf level node resides is termed to be the "owner" of the B+tree leaf level node/page. Put another way, the ownership of a file belongs to the computer node where the B+tree leaf level node/page associated with the file is resident.

Namespace partitioning helps in a scale-out filesystem setup, as ownership of a file is confined to the computer node which owns the B+tree leaf page. All filesystem entity access including reads and writes to a given file are done on the computer node which owns the file. Given a B+tree is a self-balancing tree, a large namespace thus tends to evenly distribute across different computer nodes in a computer cluster, and makes effective use of CPUs and memory. In one embodiment, changes are made at the inode cache level not to cache the files that are not owned by the cluster node.

In one embodiment, when the Mtree is first created, the INTR1 level node reside in a computer node where the Mtree was created. As files are created and the leaf level nodes/pages get filled up, when the number of INTR2 level nodes/pages in a given computer node exceed a threshold, INTR2 level nodes/pages are moved to another computer node such that as few directories as possible are not split across a computer node boundary. Thus, if a directory spans two INTR2 level nodes, it is attempted to put both INTR2 level nodes in one computer node.

In one embodiment, to temper the balance between a B+tree's nature to self-balance and the high cost of balancing a large subtree from one computer node to another computer node, a set of operating parameters, thresholds, and/or factors, and/or a migration policy are used to reduce the equivalent of 'thrashing' wherein data is transferred between multiple computer nodes in a short period of time.

Figure 6A:
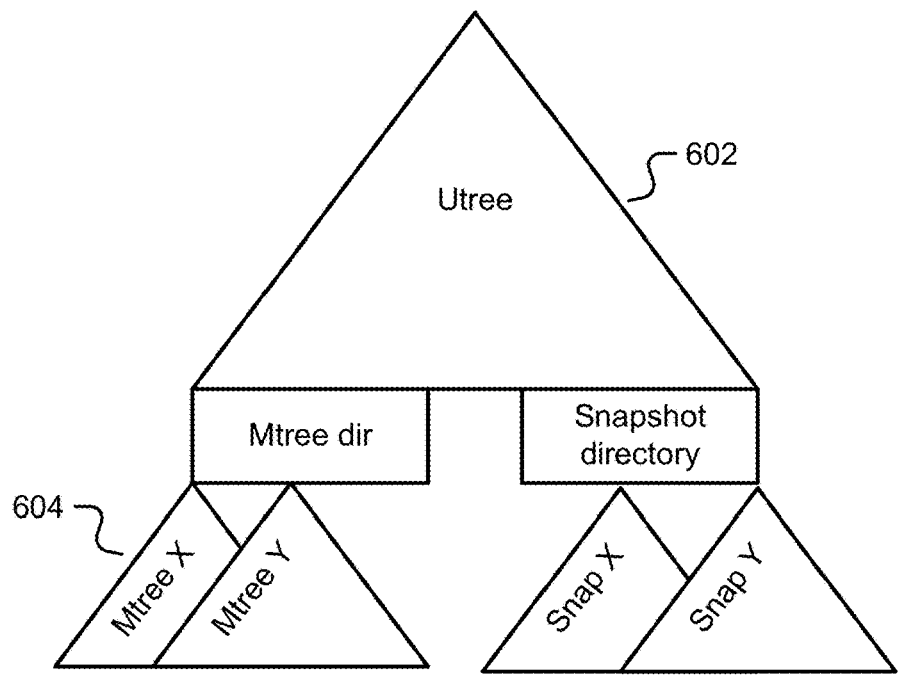
FIG. 6A is an illustration of a multi-tree system.

FIG. 6A is an illustration of a multi-tree system. In one embodiment, there are two B+trees that constitute the namespace, namely a "Utree" (602) and one or more Mtrees (604). The Utree is a single B+tree the includes all Mtrees and snapshots in a system. Any person having ordinary skill in the art will appreciate that a snapshot may be stored as its own Mtree for a given state and/or time, and can be understood as an Mtree in its own right. In one embodiment, Mtrees scale across different nodes whereas the Utree is resident on a computer node and/or non-distributed.

Figure 6B:
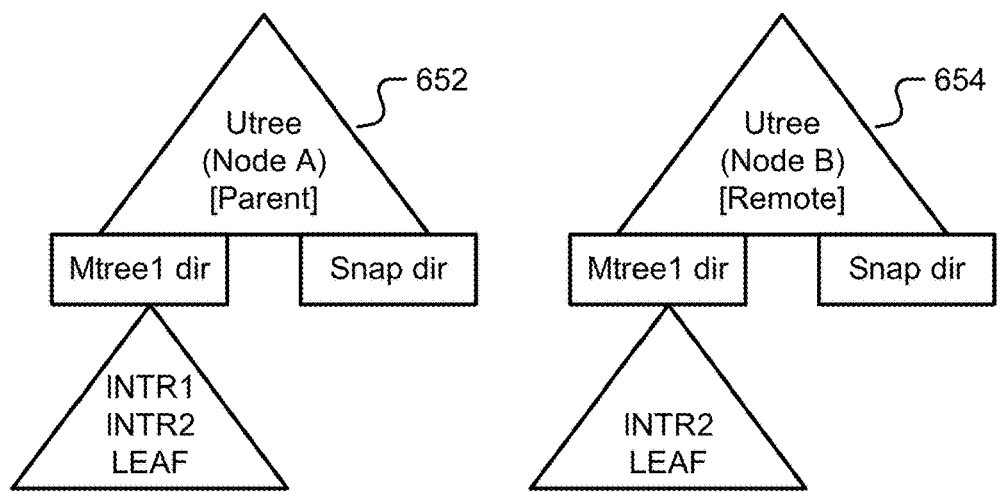
FIG. 6B is an illustration of a multi-tree computer cluster system.

FIG. 6B is an illustration of a multi-tree computer cluster system. As shown in FIG. 6A, Mtrees and snapshots may be created on a single computer node.

For a scale-out computer cluster this setup slightly changes with the concept of parent node and remote node: in one embodiment, the parent node (652) contains the INTR1 level node, INTR2 level nodes, and its own local leaf level nodes, and the remote node (654) will contain an array of INTR2 level nodes and its own local leaf level nodes. Note that both parent node (652) and remote node (654) may have the same Utree.

In one embodiment, each computer node in the computer cluster may have its own Mtree, as a B+tree, which is loaded when the system starts. The Mtree/B+tree leaf level nodes/pages are migrated based on balancing/skew factor of a B+tree across cluster nodes. Mtree/B+tree pages corresponding to internal level nodes (e.g. INTR1 and/or INTR2) of the B+tree from remote nodes in the computer cluster are cached locally.

In one embodiment, Mtree/B+tree internal level nodes (e.g. INTR1 and/or INTR2) are distributed across different computer nodes to provide lookup filesystem entities that reside in other computer nodes.

In one embodiment, a DLM (distributed lock manager) is used to keep track of lock ownership of the B+tree internal level node/pages using the following logic:
 a. A lock is granted in read or write mode for a B+tree internal level node page to a cluster's computer node;
 b. When the read lock is granted for the internal level node page, the contents of the B+tree page is refreshed with the lock grant on a remote node; and
 c. The owner of the B+tree internal level node page has read-write access, whereas remote nodes in the computer cluster have read-only access of the page.

In one embodiment, remote nodes in the computer cluster have read-only access to a given Mtree/B+tree page, whereas the local node has read/write access on the given page. Thus, Create/Update/Delete/final lookup may happen on the computer node where the Mtree/B+tree resides. This lookup may happen on a remote internal node to identify the computer node which owns the given B+tree leaf page.

Figure 7:
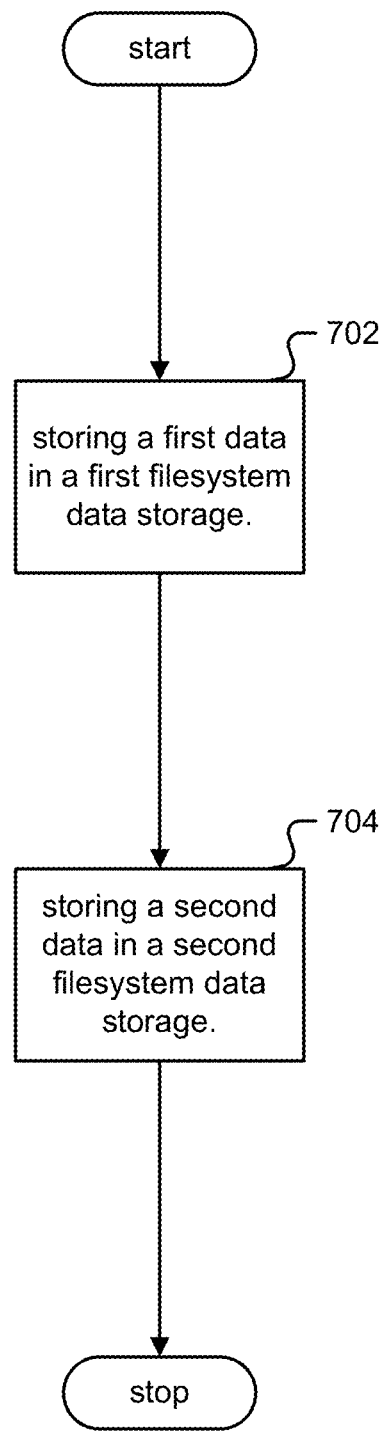
FIG. 7 is a flow chart illustrating an embodiment of a process for global namespace.

FIG. 7 is a flow chart illustrating an embodiment of a process for global namespace. In one embodiment, the process of FIG. 7 takes place in the computer cluster shown in FIG. 2.

In step 702, a first data is stored in a first filesystem data storage, wherein the first filesystem data storage is part of a first cluster node (e.g. Node A (202)) that comprises a common filesystem metadata. In one embodiment, the common filesystem metadata offers a dynamic partitioning of a global namespace for a computer cluster. As described above, the common filesystem metadata may be structured as one or more of the following: a tree, a B+tree, a B+tree with depth of three levels, and a B+tree constrained such that an associated directory cannot be split across two or more computer nodes.

In step 704, a second data is stored in a second filesystem data storage, wherein the second filesystem data storage is part of a second cluster node coupled with the first cluster node that comprises the common filesystem metadata. The first cluster node and the second cluster node are associated with the computer cluster for shared storage.

In one embodiment, the common filesystem metadata and each filesystem data storage is associated with a filesystem. Without limitation, an example of the filesystem is deduplicating filesystem like DDFS.

In one embodiment, the common filesystem metadata comprises one or more of the following: a file manager layer (304) for the filesystem; a directory manager layer (306) for the filesystem; a content store (308); a segment store (310); an index layer (310); a container manager layer (312); a storage layer (314); and a RAID layer (314).

In one embodiment, one of the two cluster nodes is a parent node for the filesystem. This parent node maintains a top level of the tree, and the parent node (and another computer node) determines whether a subtree is migrated from one node to another node based at least in part on a migration policy. Migration may happen if the tree tends towards a self-balancing tree. An mode/dirent is stored in a leaf level of the tree. The tree may be one of a plurality of trees for a common library. The tree may also have an associated snapshot tree for a common library.

Figure 8:
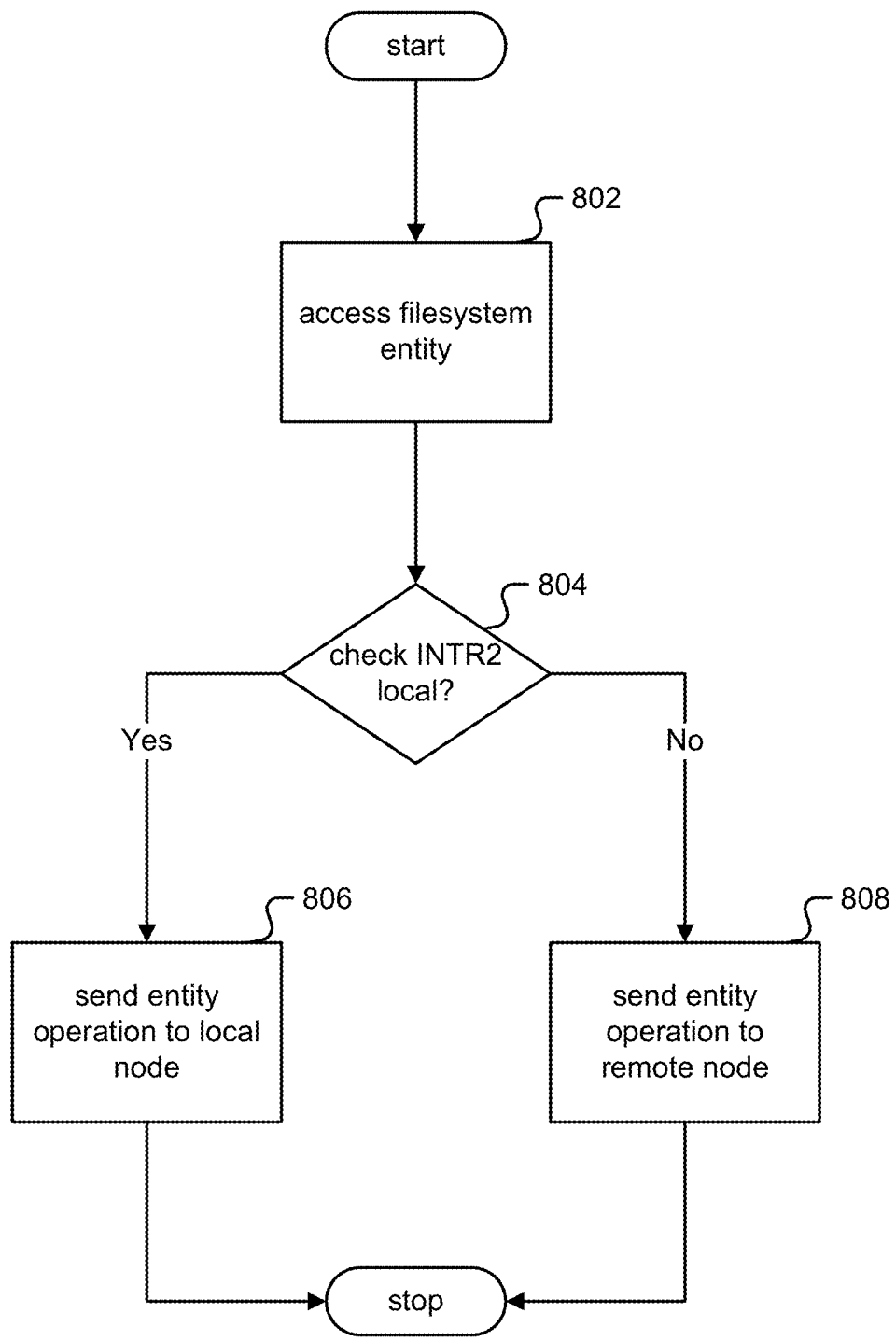
FIG. 8 is a flow chart illustrating an embodiment for routing namespace operations.

FIG. 8 is a flow chart illustrating an embodiment for routing namespace operations. In one embodiment, the process of FIG. 8 takes place in the computer cluster shown in FIG. 2.

In step 802, a request for a filesystem entity access is received. The access may include, for example, a lookup/create/delete/update of a file or a lookup/create/delete/update of a directory.

If it is determined in step 804 that the INTR2 internal level node associated with the filesystem entity resides on a local node, then control transfers to step 806; otherwise control transfers to step 808.

In step 806, the filesystem entity access, including the lookup/create/delete/update operation is sent to the local node. In step 808, the filesystem entity access, including the lookup/create/delete/update operation is sent to the associated remote node.

Figure 9:
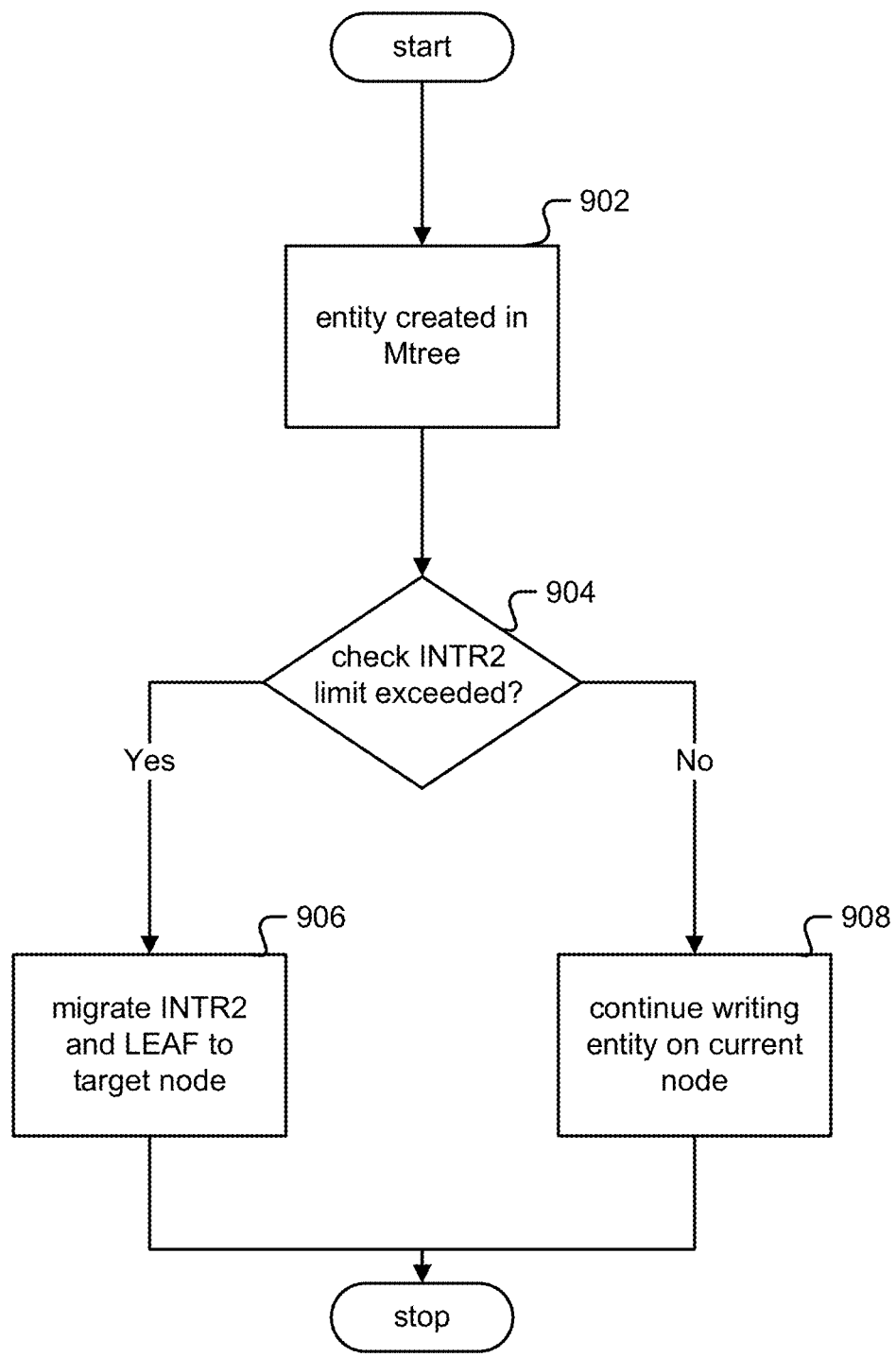
FIG. 9 is a flow chart illustrating migration of internal level nodes.

FIG. 9 is a flow chart illustrating migration of internal level nodes. In one embodiment, the process of FIG. 8 takes place in the computer cluster shown in FIG. 2.

In step 902, a filesystem entity, for example a file or a directory, is created in an Mtree. If it is determined in step 904 that the number of INTR2 level nodes as a result of step 902 exceed a limit determined by a migration policy and/or threshold and/or operating parameters/factors, then (906) one or more INTR2 level nodes and associated leaf level nodes are migrated to a target computer node. This operation may involve migrating the INTR2 level node from one computer node to another computer node, which may result in updating the INTR1 node entry in the parent node or deletion of an INTR2 level node in a computer node. In one embodiment, the target computer node is determined by a count of computer nodes with the least amount of INTR2 level nodes.

If it is determined in step 904 that the number of INTR2 level nodes do not exceed the limit, then (908) the filesystem entity and its associated INTR2 level nodes/leaf level nodes are written on the current computer node.

Crash-Recovery.

In one embodiment, in the event of a computer node crash the failover of the Utree-Mtrees occurs for one of the survivor nodes, and the failover Utree is read by one of the computer nodes in the computer cluster. The computer node that is picked up to host the failover Utree-Mtrees is preferred to be the one with a smallest workload.

In one embodiment, the replay of an NVRAM journal happens by a recovery module that recovers the Mtree. Once the replay is done the failover Utree-Mtrees is read. Concurrently, when the recovery is in progress the part of Mtree that is being accessed for a failover computer node can return EAGAIN, or another type of try-again error. This failover Utree-Mtrees can be failed back to a new computer node that joins the computer cluster or will be hosted by one of the computer node.

Block Recoverability.

As it is preferred the computer cluster should not have a single point of failure, NVRAM is mirrored across different computer nodes in the computer cluster. In one embodiment, SSD may be used for large journals instead of NVRAMS. The blocks written to a computer node may either be written across computer nodes in a Redundant Array of Independent Nodes (RAIN) fashion or may be spread across computer nodes by using a random function and/or hashing function such that a copy of blocks is written to another computer node. Containers written by the filesystem such as DDFS are either written to different nodes in a RAIN fashion or are copied to other nodes using random function and hashing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a first computer cluster node including a first filesystem data storage system;
   a second computer cluster node coupled with the first computer cluster node and including a second filesystem data storage system;
   a common filesystem metadata that is configured to be shared by the first computer cluster node and the second computer cluster node;
   wherein the first computer cluster node and the second computer cluster node are associated with a cluster for shared storage;
   wherein the common filesystem metadata is structured as a tree having a root node, a plurality of intermediate nodes, a plurality of leaf nodes, wherein the root node and each intermediate node are replicated across the first computer cluster node and the second computer cluster node and stored in their respective filesystem data storage system, wherein each of the plurality of leaf nodes resides only on one computer cluster node;
   wherein the tree includes one or more subtrees, with a top level of the tree maintained on a parent computer node, which determines whether each of the one or more subtrees is migrated from one node to another node based at least in part on a migration policy, wherein the migration policy tends toward a self-balancing tree.

2. The system of claim 1, wherein the common filesystem metadata offers a dynamic partitioning of a global namespace for the cluster.

3. The system of claim 1, wherein the tree is a B+tree.

4. The system of claim 3, wherein the B+tree has a depth of three levels.

5. The system of claim 3, wherein the B+tree is constrained such that a directory cannot be split across two or more cluster nodes.

6. The system of claim 1, wherein the common filesystem metadata and each filesystem data storage system is associated with a filesystem.

7. The system of claim 6, wherein the common filesystem metadata comprises a file manager layer for the filesystem.

8. The system of claim 6, wherein the common filesystem metadata comprises a directory manager layer for the filesystem.

9. The system of claim 6, where each filesystem data storage system comprises one or more of the following for the filesystem: a content store, a segment store, an index layer, a container manager layer, a storage layer, and a RAID layer.

10. The system of claim 6, wherein the filesystem is a deduplicating filesystem.

11. The system of claim 6, wherein the first cluster node is a parent computer node for the filesystem.

12. The system of claim 11, wherein an inode is stored in a leaf level of the tree.

13. The system of claim 1, wherein the tree is one of a plurality of trees for a common library.

14. The system of claim 13, wherein the tree has an associated snapshot tree for a common library.

15. The system of claim 1, wherein the parent computer node includes a plurality of top nodes.

16. The system of claim 1, when a number of intermediate nodes on either the first computer cluster node or the second computer cluster node exceeds a threshold, the intermediate nodes on the computer cluster node are moved to another computer cluster node.

17. The system of claim 1, wherein when a directory in the tree spans two more intermediate nodes, the two or more intermediate nodes are to be placed in a same computer cluster node.

18. A method, comprising:
   storing a first data in a first filesystem data storage system, wherein the first filesystem data storage system is part of a first computer cluster node that shares a common filesystem metadata;
   storing a second data in a second filesystem data storage system, wherein the second filesystem data storage system is part of a second computer cluster node coupled with the first cluster node that shares the common filesystem metadata; and
   wherein the first computer cluster node and the second computer cluster node are associated with a cluster for shared storage, wherein the common filesystem metadata is structured as a tree having a root node, a plurality of intermediate nodes, a plurality of leaf nodes, wherein the root node and each intermediate node are replicated across the first computer cluster node and the second computer duster node and stored in their respective filesystem data storage system, wherein each of the plurality of leaf nodes resides only on one computer cluster node;

wherein the tree includes one or more subtrees, with a top level of the tree maintained on a parent computer node, which determines whether each of the one or more subtrees is migrated from one node to another node based at least in part on a migration policy, wherein the migration policy tends toward a self-balancing tree.

19. A computer program product, the computer program product being embodied in a tangible computer readable storage medium and comprising computer instructions for:
   storing a first data in a first filesystem data storage system, wherein the first filesystem data storage system is part of a first computer cluster node that shares a common filesystem metadata;
   storing a second data in a second filesystem data storage system, wherein the second filesystem data storage system is part of a second computer cluster node coupled with the first cluster node that shares the common filesystem metadata;
   wherein the first computer cluster node and the second computer cluster node are associated with a cluster for shared storage, wherein the common filesystem metadata is structured as a tree having a root node, a plurality of intermediate nodes, a plurality of leaf nodes, wherein the root node and each intermediate node are replicated across the first computer cluster node and the second computer cluster node and stored in their respective filesystem data storage system, wherein each of the plurality of leaf nodes resides only on one computer cluster node;
   wherein the tree includes one or more subtrees, with a top level of the tree maintained on a parent computer node, which determines whether each of the one or more subtrees is migrated from one node to another node based at least in part on a migration policy, wherein the migration policy tends toward a self-balancing tree.

* * * * *